Sept. 5, 1967  G. H. THOMAS ETAL  3,340,476
SINE WAVE SYNTHESIS CIRCUIT
Filed March 23, 1965
4 Sheets-Sheet 1
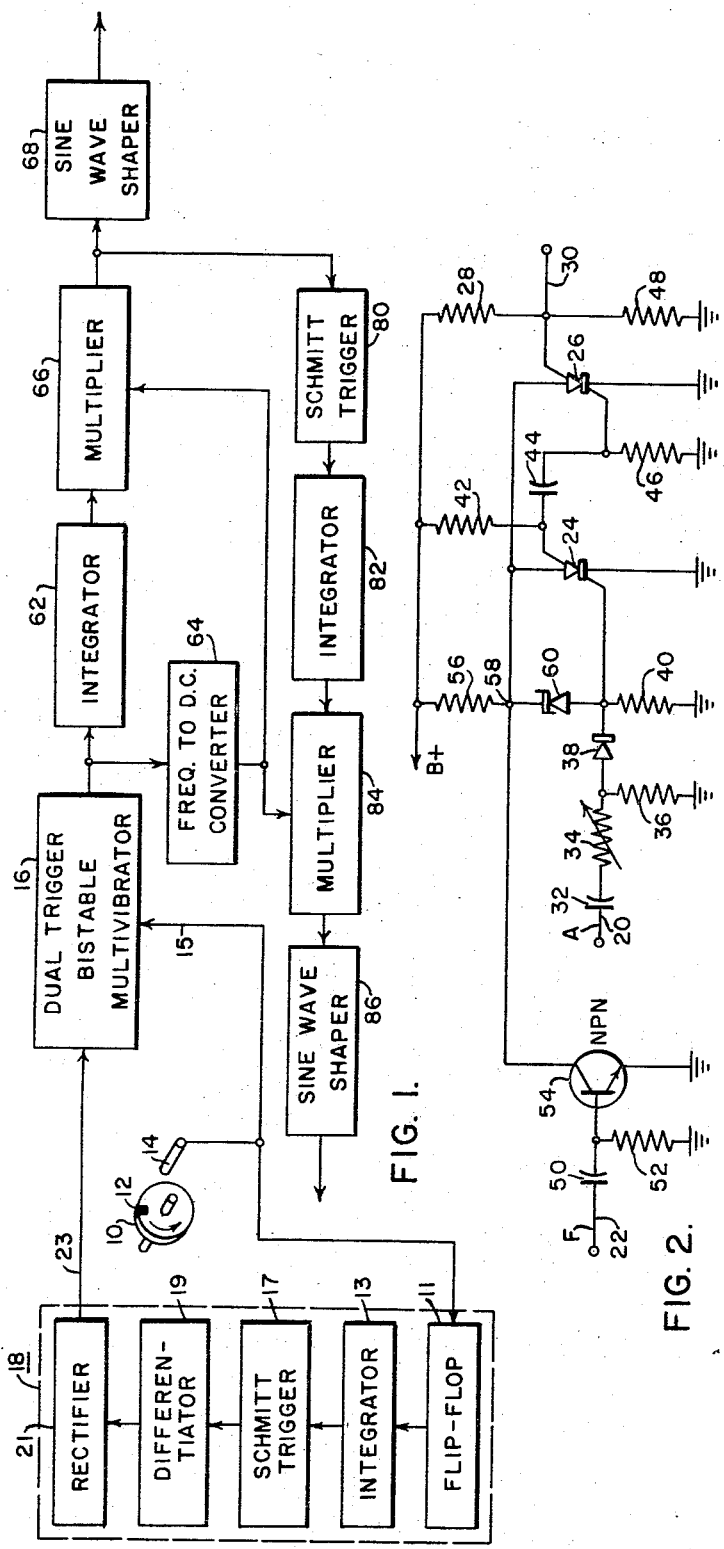
FIG. 1.
FIG. 2.
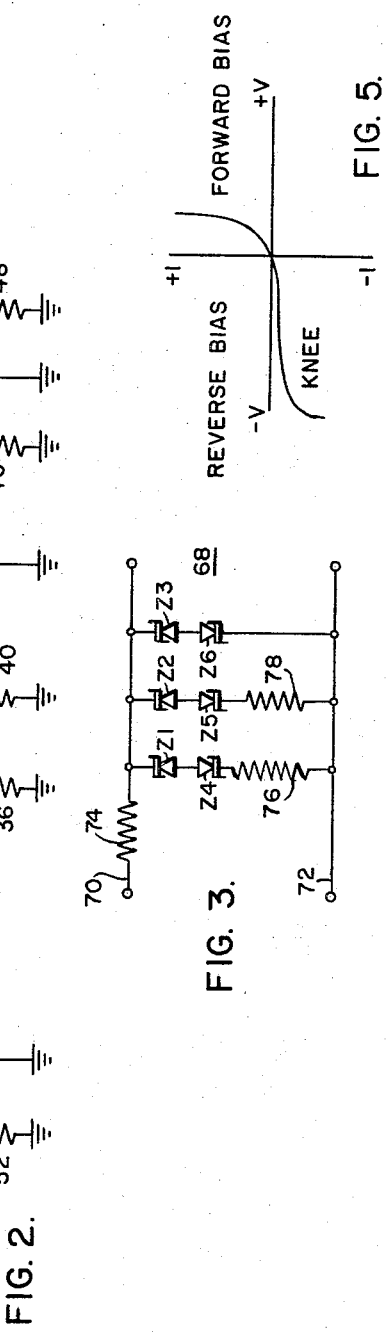
FIG. 3.
FIG. 5.
INVENTORS
Glen H. Thomas and
Robert S. Morrow
BY
ATTORNEY Sept. 5, 1967     G. H. THOMAS ETAL     3,340,476
SINE WAVE SYNTHESIS CIRCUIT
Filed March 23, 1965     4 Sheets-Sheet 4

INVENTORS
Glen H. Thomas and
Robert S. Morrow.
BY
ATTORNEY

United States Patent Office
3,340,476
Patented Sept. 5, 1967

3,340,476
SINE WAVE SYNTHESIS CIRCUIT
Glen H. Thomas and Robert S. Morrow, Columbus, Ohio, assignors to International Research and Development Corporation, Worthington, Ohio, a corporation of Ohio
Filed Mar. 23, 1965, Ser. No. 442,150
6 Claims. (Cl. 328—27)

ABSTRACT OF THE DISCLOSURE

Described is apparatus for converting a pulsed input signal into a sine wave output signal by means including circuitry responsive to the pulsed signal for generating a square wave signal, means coupled to the output of the square wave generating circuitry for producing a triangular waveform having an amplitude which is constant regardless of the frequency of the square wave signal, and a sine wave shaper responsive to the triangular waveform.

---

This invention relates to circuitry for converting a pulsed input signal into one or more sine wave output signals whch can vary in frequency over a wide range, and more particularly to a circuit of the type described, in which the output signals are of constant amplitude and have a specified phase relationship with respect to the input pulses.

While not limited thereto, the present invention is particularly adapted for use with vibration analyzing apparatus for balancing rotating bodies and the like. Such apparatus commonly utilizes an electromagnetic transducer or vibration pickup which transforms mechanical vibrations into an electrical signal having a frequency equal to that of the vibrations and an amplitude proportional to the magnitude of the vibrations. This signal may then be used in appropriate circuitry for determining a point of unbalance on the rotating body such that the condition may be corrected by balancing weights or the like.

In a balancing operation, it often happens that two or more sources of unbalance are present in a piece of equipment to be balanced and are generating vibrations of different frequencies, with the result that a composite electrical signal composed of several different frequencies is produced by an electromagnetic transducer in contact with the equipment. In order to derive a signal having the frequency of the part to be balanced, it becomes necessary to employ a band-pass filter which will separate a particular frequency associated with a single vibrating part from other frequencies in order to effect a balancing operation.

Furthermore, since the speed of rotation of the body being balanced may vary over a relatively wide range, the filter must be variable in order to accommodate all of the anticipated frequencies. This is particularly true in the case of an internal combustion engine or the like where there may be not only several sources of unbalance; but, in addition, the speed of the rotation of the various parts of the engine cannot be accurately controlled. For instance, the speed of an engine with a throttle adjustment set for 1500 revolutions per minute may actually vary from this value, by say, plus or minus one hundred revolutions per minute. In this instance, the frequency of the alternating current signal passing through the band-pass filter of the analyzing equipment will also vary correspondingly. As a result, it becomes necessary to employ a synchronous band-pass filter in which the pass-band varies as a function of the speed of the rotating body being analyzed. The pass-band of such synchronous filters, in turn, is usually controlled by means of an alternating current signal which varies in frequency as the speed of the rotating body varies. This signal must have a specified phase relationship with respect to the unbalance signal and be of constant amplitude.

While the aforesaid alternating current signal can be derived by means of a tachometer generator mechanically connected to the rotating body, it is sometimes difficult and usually inconvenient to provide the necessary mechanical connection between the tachometer generator and the rotating body. The more or less obvious way in which to generate the alternating current signal without any connection to the rotating body is with the use of a synchronized oscillator driven by means of pulses derived from a photocell or magnetic pickup associated with the rotating body. In the case of the photocell, for example, it would be directed onto a rotating body having a light or dark spot thereon, as the case may be, such that the photocell would produce one pulse for each revolution of the body. The resulting pulses could then be used as synchronizing pulses to drive the oscillator.

The difficulty with this method, however, is that the oscillator must be tuned to a particular frequency, and the synchronizing pulses can vary this frequency by plus or minus five percent at most, a condition which is unsatisfactory for most vibration analyzing equipment.

Accordingly, the objects of the invention include:

To provide a means for generating a sine wave signal having a frequency which varies over a wide range as the speed of rotation of a rotating body varies without requiring any mechanical connection to the body.

To provide means for generating a sine wave signal of constant amplitude and having a frequency which varies as the speed of rotation of a rotating body without requiring any mechanical connection to the body.

To provide means, not requiring any mechanical connection to a rotating body, for producing two sine wave signals, each of which has the same frequency as the speed of rotation of a rotating body, but which are displaced in phase with respect to each other.

To provide apparatus for synthesizing a sine wave output signal from a pulsed input signal.

The above and other objects and features of the invention will become apparent from the following detailed description taken in connection with the accompanying drawings, in which:

FIGURE 1 is a block diagram illustrating one embodiment of the apparatus of the invention for converting a pulsed input signal into a sine wave output;

FIG. 2 is a schematic circuit diagram of the dual trigger bistable multivibrator employed in the apparatus of FIG. 1;

FIG. 3 is a schematic circuit diagram of the sine wave shapers used in the apparatus of FIG. 1;

Figure 4:
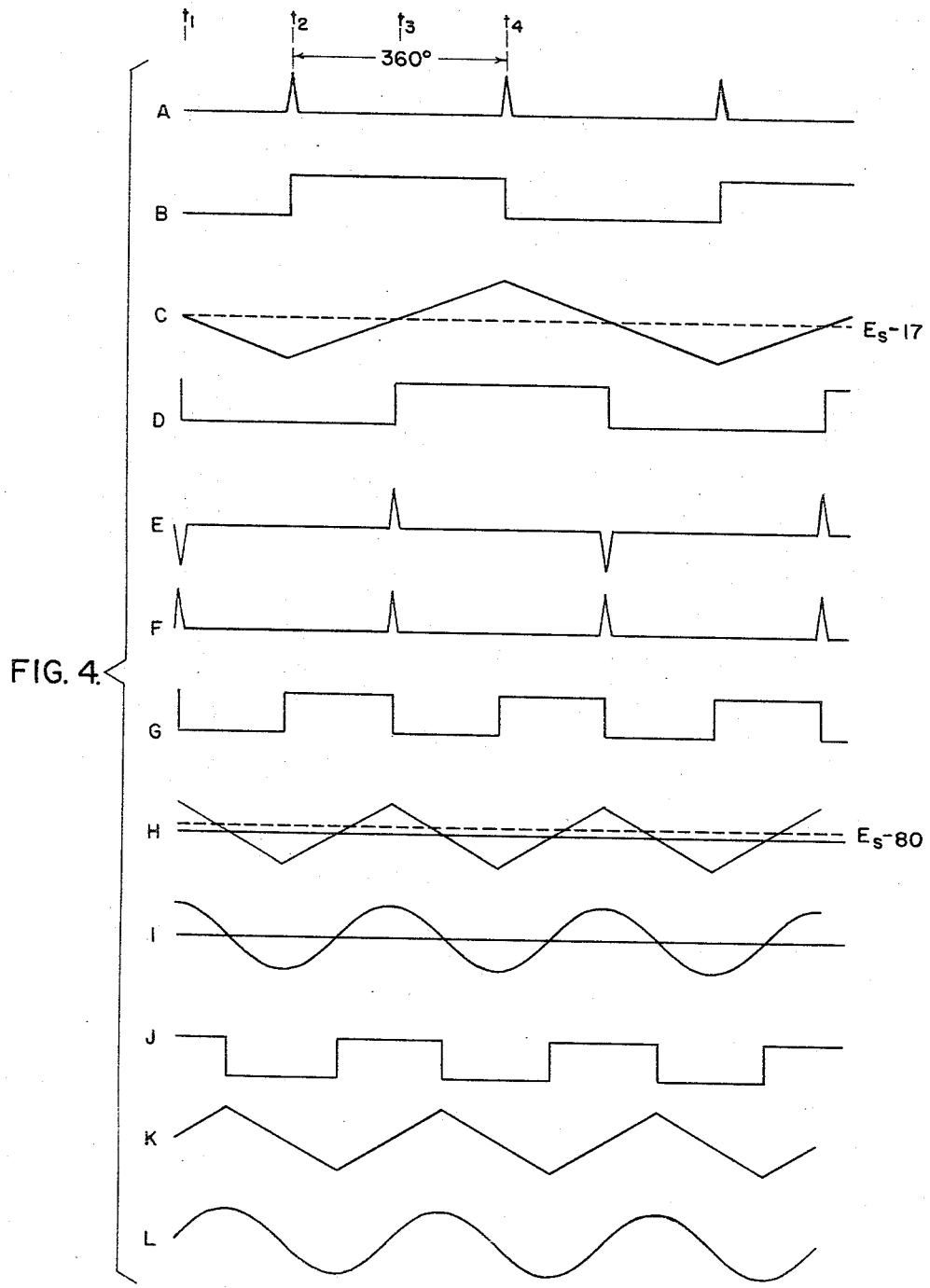
Figure 7:
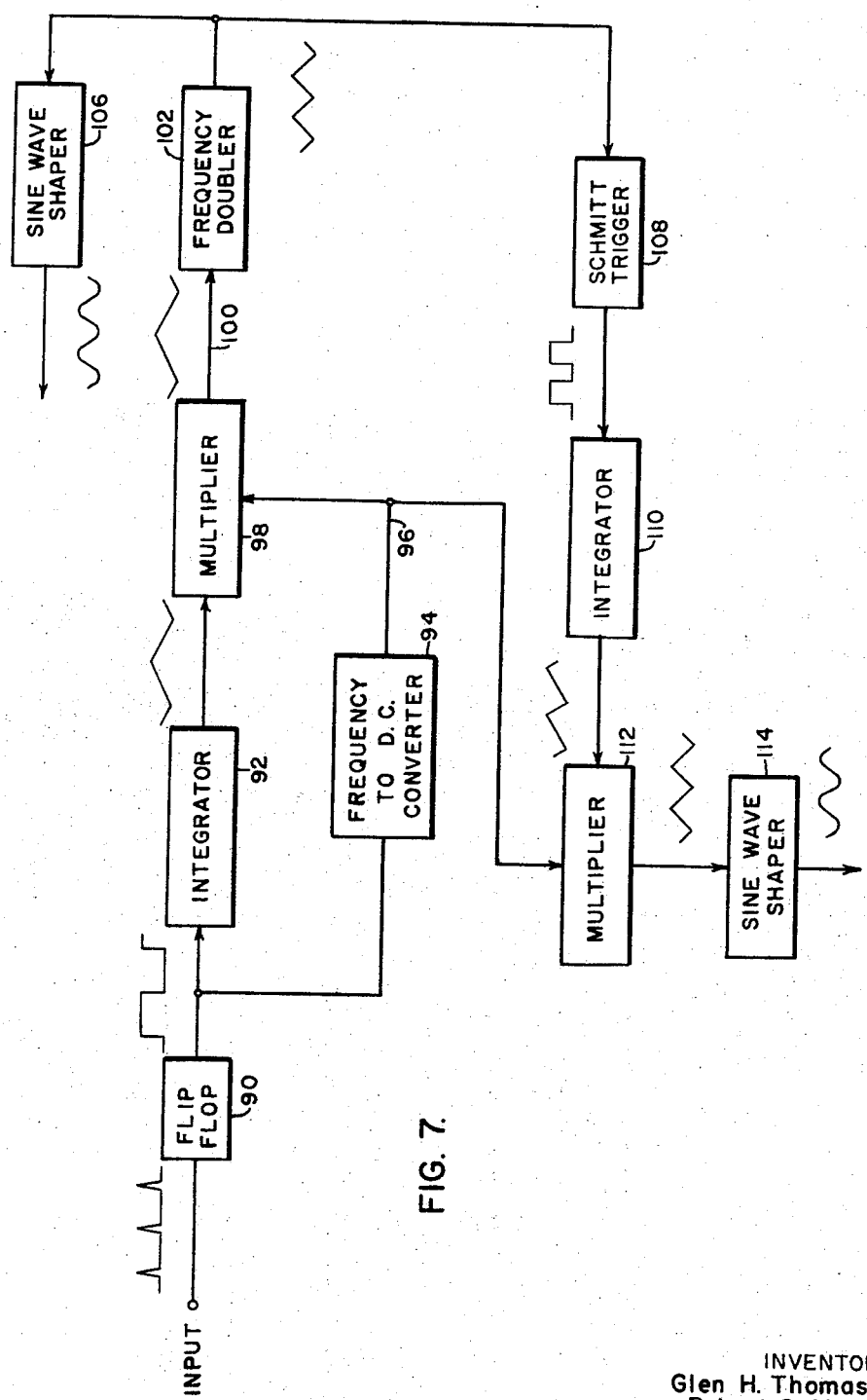
Figure 8:
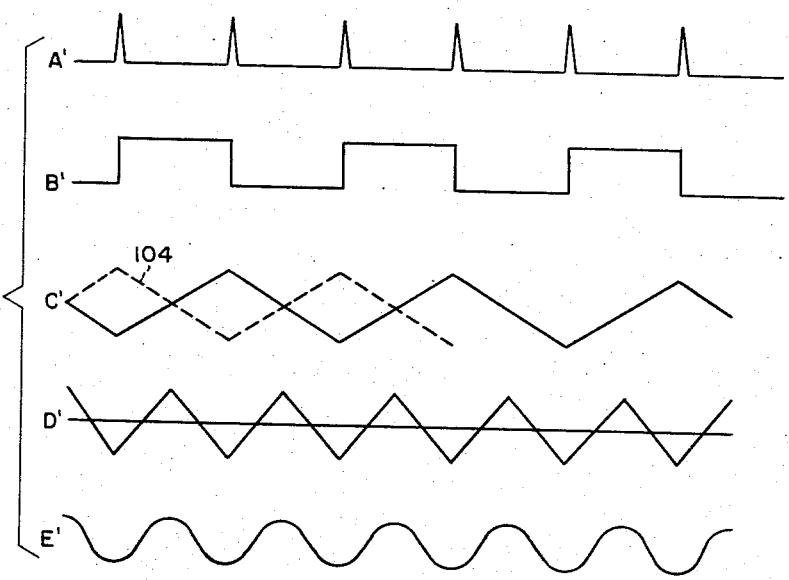
Figure 6:
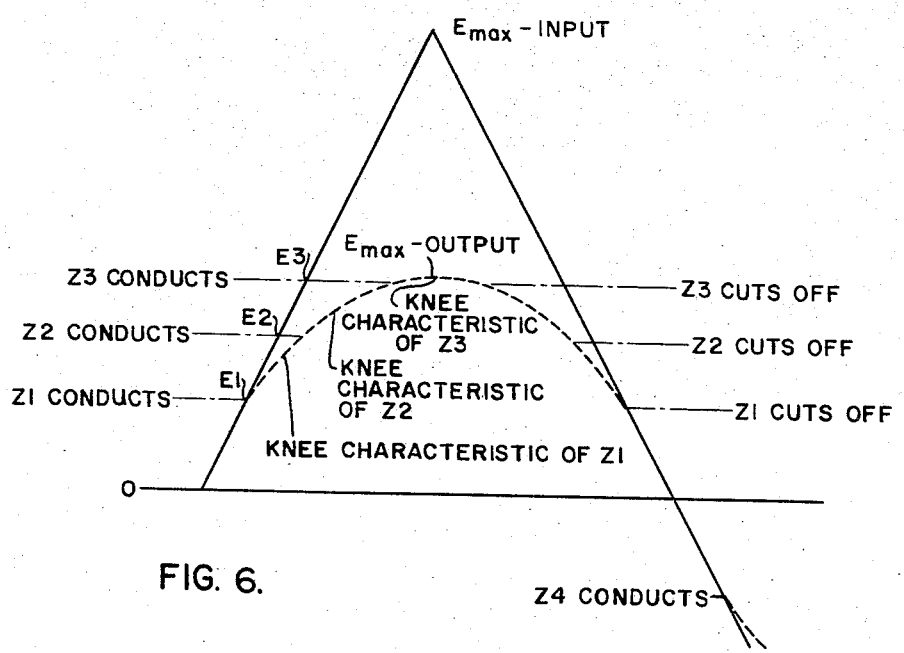

FIG. 4 comprises waveforms illustrating the operation of the apparatus of FIG. 1;

FIG. 5 is a plot of current versus voltage for the Zener diodes employed in the sine wave shaper of FIG. 3;

FIG. 6 is a graphical illustration of the operation of the sine wave shaper of FIG. 3;

FIG. 7 is a block circuit diagram of another embodiment of the invention for converting a pulsed input signal into a sine wave output signal; and FIG. 8 comprises waveforms illustrating the operation of the circuit of FIG. 7.

With reference now to the drawings, and particularly to FIG. 1, a rotating member 10 is shown which, in the example given, is light-colored and has a dark spot 12 at one point around its periphery such that a photocell 14 will be actuated once during each rotation of the member 10.

Alternatively, the spot 12 could be replaced by a keyway, assuming that the member 10 is magnetically permeable, and the photocell 14 replaced by a magnetic pickup with the same overall effect.

The resulting pulses, illustrated as waveform A in FIG. 4, are applied directly to a dual trigger bistable multivibrator 16 through conductor 15, as well as through a pulse phase shift circuit 18, enclosed by broken lines, to the bistable multivibrator 16. In passing through the pulse phase shift circuit 18, the pulses in waveform A are shifted in an amount equal to 180° of rotation of the member 10 such that each pulse at the output of circuit 18 will be intermediate two pulses in waveform A. That is to say, assuming that the pulses in waveform A occur when the mark 12 on member 10 is at the top dead center position, pulses at the output of circuit 18 will occur when the mark 12 is displaced 180° with respect to its top dead center position.

The pulse phase shift circuit 18 includes a flip-flop unit 11 to which the pulses in waveform A are applied. The output of the flip-flop 11, therefore, appears as waveform B in FIG. 4. By integrating the waveform B in integrator 13, waveform C of FIG. 4 is produced. This waveform is applied to a Schmitt trigger circuit 17. As is known, a Schmitt trigger circuit is a type of multivibrator which will shift from one stable state to the other whenever the magnitude of an input signal rises above a predetermined amplitude. The circuit will remain in its other stable state until the magnitude of the input signal falls below the aforesaid predetermined amplitude. Therefore, by causing the circuit 17 to fire at the voltage level $E_s$–17 shown on waveform C, the waveform D will be produced. This latter waveform, it will be noted, is displaced 180° with respect to waveform B.

The resulting waveform D from circuit 17 is then applied to a differentiator 19 which produces waveform E comprising a series of spiked pulses, a positive pulse appearing at the leading edge of each square wave pulse in waveform D and a negative pulse appearing at the trailing edge. By passing waveform E through a rectifier 21, the negative pulses are inverted, producing waveform F wherein the spiked pulses are intermediate those in waveform A. These pulses are applied to the dual trigger bistable multivibrator via lead 23.

The dual trigger bistable multivibrator is shown in detail in FIG. 2 and includes an input terminal 20 to which the pulses in waveform A are applied and a second input terminal 22 to which the pulses in waveform F are applied. The multivibrator proper includes two silicon controlled switches 24 and 26 connected such that when one switch 24 or 26 conducts the other is cut off and vice versa.

At time $t_1$ shown in FIG. 4, the switch 26 will conduct, whereby current from the B+ voltage source will flow through resistor 28 to drive the output terminal 30 less positive. This condition will exist with the switch 26 conducting until time $t_2$ is reached in FIG. 4. At this time, a pulse in waveform A is applied through a capacitor 32 and a variable resistor 34 across resistor 36. The pulse is also applied through diode 38 across resistor 40; and the resulting voltage across resistor 40 applies a positive bias to the gate electrode of the silicon controlled switch 24, whereupon the switch 24 conducts.

As the switch 24 conducts, current is drawn through resistor 42, thereby lowering the anode potential on switch 24. This reduction in potential is instantaneously applied through capacitor 44 and bias resistor 46 to the gate of switch 26, thereby causing this switch to cut off. As switch 26 cuts off, its anode potential rises such that the output waveform G in FIG. 4 rises in potential at time $t_2$. The foregoing switching action occurs with extreme rapidity and, hence, the potential in waveform G rises abruptly, creating a square wave configuration.

The voltage at output terminal 30 will remain at its higher value with current flowing through resistors 28 and 48 until a pulse in waveform F is received at time $t_3$ in FIG. 4. This pulse is applied to terminal 22 and through coupling capacitor 50 across resistor 52, thereby causing NPN transistor 54 to conduct. When transistor 54 conducts, current is drawn through resistor 56, thereby lowering the potential at point 58. This potential, applied to the anodes of switches 24 and 26, causes switch 24 to cut off and switch 26 to conduct, whereupon the voltage of waveform G of FIG. 4 falls abruptly. At time $t_4$, another pulse in waveform A is received at terminal 20, whereupon the process is repeated; and it will be appreciated that a square wave signal (waveform G) is derived in which the cycle of the square wave is repeated once during each rotation of the member 10. The Zener diode 60 in the circuit of FIG. 2 is utilized for the purpose of establishing a voltage level at which the switching action will occur.

With reference, again, to FIG. 1 the output of the dual trigger bistable multivibrator comprising waveform G in FIG. 4 is applied to an integrator 62 which integrates the square waveform G to produce an integrated triangular waveform illustrated as waveform H in FIG. 4. However, the amplitude of the output waveform H from integrator 62 is frequency sensitive. That is, if we consider the fundamental of the square wave G is $E_1 \sin wt$, then the integral of this fundamental will be $$\frac{E_1}{w} \cos wt$$

Therefore, in order to eliminate the frequency factor $w$, a frequency to direct current converter 64 is connected to the output of the dual trigger bistable multivibrator, the output of this circuit 64 being represented by the factor $Kw$ where K is a constant determined by the parameters of the circuit 64. By multiplying the factor $Kw$ by $$\frac{E_1}{w} \cos wt$$

in multiplier 66, the output of the multiplier will then be $KE_1 \cos wt$, the amplitude of which is clearly not frequency sensitive. It will be understood, of course, that the harmonics included in the signal are multiplied in the same manner to eliminate amplitude variations.

From multiplier 66, the triangular waveform H of FIG. 4 is applied directly to a sine wave shaper 68. The sine wave shaper is shown in detail in FIG. 3 and includes three parallel paths each containing two Zener diodes in back-to-back relationship with their anodes interconnected. As is known, the Zener diode is such that as the reverse voltage is increased from zero, the current increases very slowly until the Zener voltage is reached. At this point the diode, in effect, breaks down; and the current through the diode increases very rapidly, becoming substantially independent of voltage. This is shown in FIG. 5. When the diode is forward biased it behaves somewhat as a conventional diode. However, when a reverse bias is applied, the current remains substantially constant until the voltage reaches the Zener breakdown point, at which point the current increases rapidly in the negative direction. The knee between the state of constant current and rapidly increasing current with a reverse bias applied, however, is somewhat rounded. Advantage is taken of this fact in the present invention as will hereinafter become apparent.

Referring again to FIG. 3, the sine wave shaper 68 includes a pair of input terminals 70 and 72, the terminal 72 being grounded. Terminal 70 is connected through resistor 74 to the cathodes of a first set of Zener diodes Z1, Z2 and Z3. The anodes of diodes Z1, Z2 and Z3 are, in turn, connected to the anodes of a second set of three Zener diodes Z4, Z5 and Z6. The cathode of diode Z6 is connected directly to ground, whereas the cathodes of diodes Z4 and Z5 are connected to ground through resistors 76 and 78, respectively, resistor 76 being larger than resistor 78.

Let us assume, for example, that the peak-to-peak voltage of the triangular waveform H in FIG. 4 is 15 volts. Furthermore, it will be assumed that the breakdown voltages of diodes Z1 and Z4 are 3.9 volts; the breakdown voltages of diodes Z2 and Z5 are 4.7 volts; and the breakdown voltages of diodes Z3 and Z6 are 5.1 volts. As the positive half cycle of the triangular waveform H of FIG. 4 increases in a positive direction from the zero axis, the diode Z1 will conduct first, followed by conduction of diode Z2 and finally by conduction of diode Z3. As the voltage of waveform H then falls on the positive side of the zero axis, diode Z3 will first cut off, followed by cutting off of diode Z2 and finally cutting off of diode Z1. In this process, the triangular waveform H is rounded off to produce a positive half cycle of the sine wave I as shown in FIG. 4. Similarly, as the triangular waveform H increases in a negative direction below the zero axis, diode Z4 will conduct first, followed by conduction of diode Z5 and finally conduction of diode Z6. As the triangular waveform H rises in a positive direction, but on the negative side of the zero axis, diode Z6 will cut off first, followed by cutting off of diode Z5 and finally cutting off of diode Z4. In this process, the negative half cycle of waveform I is produced; and since the knee characteristic of the Zener diodes does not present a sharp cut-off point, a relatively small number of diodes is required in contrast to conventional sine wave shapers employing thermionic diodes. The output of circuit 68 in FIG. 1, therefore, is the sine wave I of FIG. 4.

The manner in which the sine wave shaper of FIG. 3 operates is perhaps best illustrated in FIG. 6. When a triangular waveform is applied to the input and no current is drawn, which is the case when the Zener diodes are not conducting, the output voltage is the same amplitude as the input and no current is drawn through resistor 74. This condition exists between zero voltage and $E_1$ shown in FIG. 6. When diode Z1 conducts on the positive half cycle, current is drawn through resistors 74 and 76. As a result, there is a voltage drop across resistor 74 and the output voltage is now less than the input, resulting in a change in slope of the output voltage between $E_1$ and $E_2$. When the voltage $E_2$ is reached, diode Z2 conducts in addition to diode Z1. At this point, the slope of the output, shown in broken line, is even less since the parallel combination of resistors 76 and 78 is less than resistor 76 alone. Thus, more current is drawn through resistor 74 and the output voltage is reduced more. Now, when the diode Z3 conducts at $E_3$, the knee of the diode characteristic curve becomes the primary determining factor and the output waveform is rounded off at the top.

On the negative-going portion of the positive half cycle, the diodes Z1–Z3 cut off in reverse order, with the result shown in FIG. 6. The negative half cycle is the same as the positive half, except that diodes Z4–Z6, now reverse-biased, conduct and cut off in succession rather than diodes Z1–Z3.

In order to produce a sine wave which is shifted in phase with respect to sine wave E by 90°, the triangular waveform H at the output of multiplier 66 is first applied to a Schmitt trigger circuit 80 which functions in the same manner as circuit 17 previously described. It will be assumed, for example, that the predetermined voltage level at which the Schmitt trigger circuit fires is $E_s-80$ as illustrated on waveform H in FIG. 4. Consequently, the Schmitt trigger circuit 80 will fire to produce an output pulse whenever the input signal rises above the voltage level $E_s-80$. The result is waveform J in FIG. 4 comprising a square waveform shifted in phase with respect to waveform G by 90°. The waveform J is then integrated in integrator 82 and multiplied in circuit 84 with the output of converter 64. In this respect, compensation for changes in amplitude due to changes in frequency is accomplished in the same manner as it is in multiplier 66. The resulting triangular waveform K in FIG. 4 is then applied to a sine wave shaper 86 identical to sine wave shaper 68 previously described. The result is sine wave L in FIG. 4 which is shifted in phase with respect to sine wave I by 90°.

It will be appreciated that a pulse train of twice the repetition rate of the input pulses from photocell 14 could be derived by adding the pulse trains in waveforms A and F of FIG. 4. This pulse train of twice the input frequency could then be used to drive a single trigger bistable multivibrator or flip-flop to produce a square wave. However, when a pulse is fed into a single trigger flip-flop, the flip-flop circuit switches into the stable state opposite that which it happened to have been in previously. In other words, if the train of pulses is fed into a single trigger flip-flop, the sinuosoidal waveform resulting after integrating and shaping would be either a cosine or minus cosine waveform relative to the input pulse train, depending upon the original state of the flip-flop.

However, if the bistable multivibrator circuit is utilized as in the embodiment of FIG. 1, with the pulse trains in waveforms A and F being fed into two inputs 20 and 22, the resulting sinusoidal waveform will always have a definite phase relationship to the original input pulse train. This is due to the fact that when a pulse is applied to input terminal 20 of the dual trigger bistable multivibrator of FIG. 2, the circuit can switch into only one stable state, that being the higher voltage state of waveform G. Hence, the series of pulses applied to input terminal 20 always switches the output to the higher voltage state while the series of pulses at input terminal 22 comprising waveform F always switches the output from its higher voltage level to its lower voltage level as shown in waveform G. When the input pulse train of waveform A is applied to input terminal 20 and waveform F applied to input terminal 22, the resulting waveform I is always a minus cosine waveform relative to the pulses in waveform A. If a plus cosine waveform is desired, the two input pulse trains in waveforms A and F applied to the dual trigger flip-flop of FIG. 2 may be reversed.

It can be appreciated, therefore, that if the frequency of the pulse train were doubled and a single trigger bistable multivibrator were utilized, upon exciting the circuit, one would never know whether the ouput would be a plus cosin or minus cosin waveform. This phase ambiguity is removed with the use of the dual trigger bistable multivibrator 16 in the embodiment of FIG. 1.

With reference now to FIGS. 7 and 8, another embodiment of the invention is shown in which input pulses (waveform A' of FIG. 8) are applied directly to a flip-flop circuit 90, the output of the flip-flop appearing as waveform B' in FIG. 8. Waveform B' is integrated in integrator 92, the integrated output appearing as waveform C' in FIG. 8. As in the embodiment of FIG. 1, the amplitude of the triangular waveform C' at the output of integrator 92 will vary as the frequency of the input pulses varies. Accordingly, the square wave B' is applied to a frequency-to-direct current converter 94 which produces a direct current signal on lead 96. This signal, which varies in magnitude as a function of the frequency of the input pulses, is multiplied with the triangular waveform C' in multiplier 98, thereby producing an output triangular waveform on lead 100 of constant amplitude regardless of the frequency of the input pulses.

It will be noted from FIG. 8 that one complete cycle of the triangular waveform C' is produced for every two input pulses in waveform A'. Since one input pulse is produced, for example, during each revolution of a rotating body and since it is desired to produce a complete cycle of a sine wave for each revolution of the rotating body, the triangular waveform output of multiplier 98 must be doubled in frequency in frequency doubler 102. This step eliminates any phase ambiguity. That is, assuming that the waveform D' in FIG. 8 were displaced in an amount equal to the distance between successive pulses in a waveform A', the resulting triangular waveform would be as shown by the dotted outline 104 superimposed on waveform C'. When the triangular waveform corresponding to waveform 104 is doubled in frequency doubler 102, the same waveform D' results as is produced by the solid triangular waveform C'.

After the frequency of the triangular waveform is doubled in frequency doubler 102, it may be applied directly to a sine wave shaper 106 identical to shaper 68 shown in FIG. 1. In order to produce a sine wave which is shifted in phase by 90° with respect to that produced by the sine wave shaper 106, the output of frequency doubler 102 is passed through Schmitt trigger 108, integrator 110 and multiplier 112 to a second sine wave shaper 114. Elements 108, 110, 112 and 114 correspond to elements 80, 82, 84 and 86 in FIG. 1 and function in an identical manner.

The present invention thus provides circuit means which, regardless of the frequency of the input pulses, will produce a sine wave output of constant amplitude and a specified phase relationship with respect to the input pulses. Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In apparatus for converting a pulsed input signal into a sine wave output signal, the combination of apparatus responsive to said pulsed signal for generating a square wave signal which changes voltage levels each time an input pulse is applied thereto, means for integrating the square wave signal, circuitry coupled to the output of said square wave generating apparatus for producing a signal which varies as a function of the frequency of said square wave signal, means for multiplying said last-mentioned signal with the integrated signal, and a sine wave shaper coupled to the output of said multiplying means.

2. In apparatus for converting a pulsed input signal into a sine wave output signal, the combination of apparatus responsive to said pulsed signal for generating a square wave signal which changes voltage levels each time an input pulse is applied thereto, means for integrating the square wave signal, circuitry coupled to the output of said square wave generating apparatus for producing a direct current signal which varies in magnitude as a function of the frequency of said square wave signal, means for multiplying said direct current signal with the integrated signal to produce a triangular waveform having a peak amplitude which is constant regardless of the frequency of the input pulses, and a sine wave shaper coupled to the output of said multiplying means.

3. In apparatus for converting a pulsed input signal into a sine wave output signal, the combination of means for shifting the input pulses in phase in an amount equal to one-half the spacing between said input pulses, a dual trigger bistable multivibrator having a pair of input terminals and arranged such that an input pulse applied to the one input terminal will cause the output from the multivibrator to rise in voltage while an input pulse applied to the other input terminal will cause the output from the multivibrator to fall in voltage, means for applying pulses at the output of said phase shifting means to said one input terminal, means for applying input pulses which have not been shifted in phase to the other of said input terminals, circuit apparatus coupled to the output of said dual trigger bistable multivibrator for producing a triangular waveform which does not vary in peak amplitude as the frequency of the input pulses varies, and a sine wave shaper coupled to the output of said last-named circuit apparatus.

4. In apparatus for converting a pulsed input signal into a sine wave output signal, the combination of apparatus responsive to said pulsed signal for generating a square wave signal which changes voltage levels each time an input pulse is applied thereto, means for integrating the square wave signal, circuitry for producing a direct current signal which varies as a function of the frequency of said input pulses, means for multiplying said direct current signal with the integrated signal, and a sine wave shaper coupled to the output of said multiplying means.

5. In apparatus for converting a pulsed input signal into a sine wave output signal, the combination of means for shifting the input pulses in phase in an amount equal to one-half the spacing between said input pulses, a dual trigger bistable multivibrator having a pair of input terminals and arranged such that an input pulse applied to the one input terminal will cause the output from the multivibrator to rise in voltage while an input pulse applied to the other input terminal will cause the output from the multivibrator to fall in voltage, means for applying pulses from said phase shifting means to said one input terminal, means for applying input pulses which have not been shifted in phase to the other of said input terminals, circuitry coupled to the output of said dual trigger bistable multivibrator for producing a direct current signal which varies in amplitude as a function of the frequency of said input pulses, means for integrating the output of said dual trigger bistable multivibrator, means for multiplying said direct current signal with the integrated output of the dual trigger bistable multivibrator, and a sine wave shaper coupled to the output of said multiplying means.

6. The apparatus of claim 5 and including a Schmitt trigger circuit coupled to the output of said multiplying means, an integrator for integrating the output of said Schmitt trigger circuit, second multiplying means for multiplying said direct current signal with the integrated output of said Schmitt trigger circuit, and a second sine wave shaper coupled to the output of said second multiplying means.

References Cited

UNITED STATES PATENTS 2,748,278   5/1965   Smith _____ 328—21 XR
3,155,838   11/1964   Brahm _____ 328—181

ARTHUR GAUSS, *Primary Examiner.*

J. ZAZWORSKY, *Assistant Examiner.*